E. KRON.
ANTISKIDDING DEVICE FOR AUTOMOBILES.
APPLICATION FILED FEB. 11, 1910.

1,023,255.

Patented Apr. 16, 1912.

WITNESSES

INVENTOR.
Edmund Kron
By Benedict, Morsell & Caldwell
ATTORNEYS.

UNITED STATES PATENT OFFICE.

EDMUND KRON, OF MILWAUKEE, WISCONSIN.

ANTISKIDDING DEVICE FOR AUTOMOBILES.

1,023,255. Specification of Letters Patent. Patented Apr. 16, 1912.

Application filed February 11, 1910. Serial No. 543,352.

*To all whom it may concern:*

Be it known that I, EDMUND KRON, residing in Milwaukee, in the county of Milwaukee and State of Wisconsin, have invented new and useful Improvements in Antiskidding Devices for Automobiles, of which the following is a description, reference being had to the accompanying drawings, which are a part of this specification.

This invention has for its object to provide means for preventing the skidding of automobile wheels and the like on snow and ice and comprises a runner attachment preferably provided with a movable guide-plate which is free to drop below the level of the runner sole and maintain its guiding contact with the road surface at all times.

With the above, and other objects in view, the invention consists in the anti-skidding device herein claimed and all equivalents.

Figure 1:
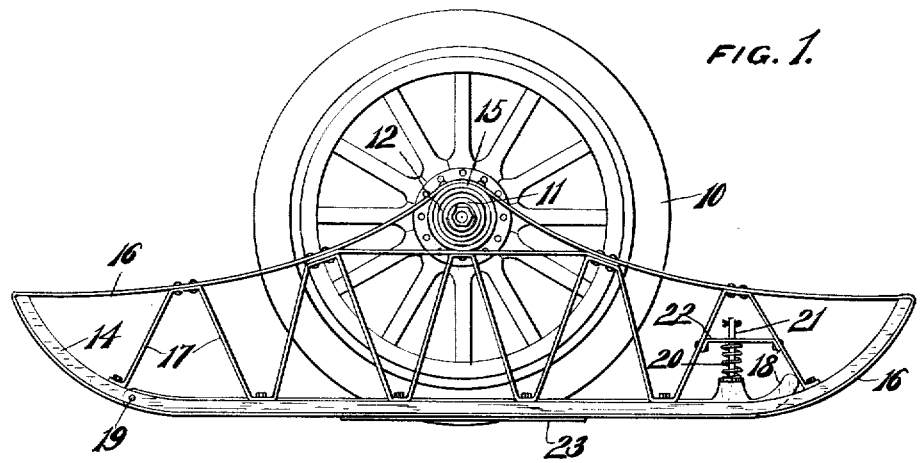
Figure 2:
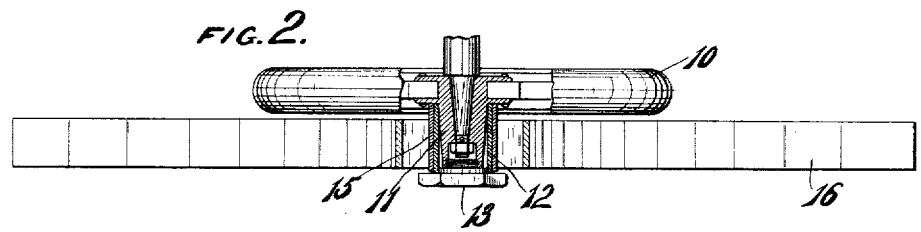
Figure 3:
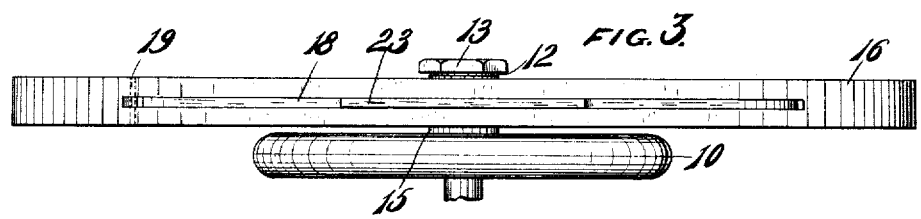
Figure 4:
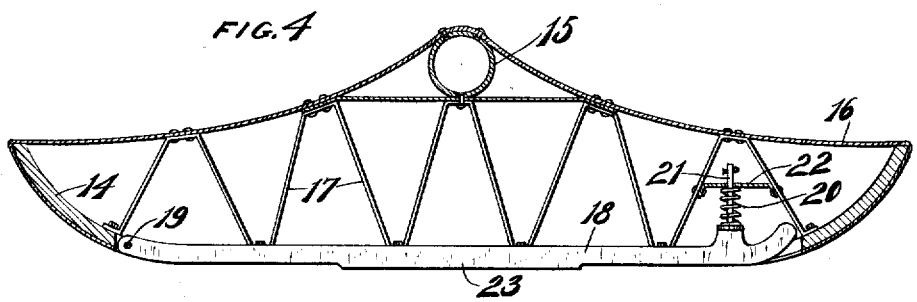

Referring to the accompanying drawings in which like characters of reference indicate the same parts in the different views; Figure 1 is a side elevation of an anti-skidding device constructed in accordance with this invention, the hub cap being removed; Fig. 2 is a plan view thereof with the wheel connection in section; Fig. 3 is a plan view of the device inverted; and Fig. 4 is a central sectional view of the device.

In these drawings 10 indicates the wheel of an automobile or the like having the usual tubular hub extension 11 upon which the anti-skidding device of this invention is mounted, preferably by having a tubular bushing 12 fitting on the outside of the tapering hub extension 11 and clamped in place thereon by a hub cap 13 which threads into the end of the plug extension and is provided with a shoulder to fit within the bushing, as shown in Fig. 2. This bushing 12 forms a bearing for a runner which has a corresponding sleeve portion 15 fitting on the tubular bushing 12 and held in place by the hub cap 13. The runner is desirably of the shape of the runner of a sleigh with both ends upturned and the sole thereof extending from end to end above the wooden strip 14, as well as beneath it, to make a rigid connection for the sleeve 15. With the runner shown in the drawings the space between the upper portion of the wooden strip and the continuation of the metal sole 16 is occupied by a truss work 17 to form a frame structure and give strength and rigidity to the device, but it is to be understood that the principles of the invention do not depend upon the exact construction of the runner here shown, for the runner may be of any type desired suitable for the purpose intended.

The runner alone may be employed as a means for preventing the wheels sinking deeply into soft snow, or it may be provided with a movable guide-plate to follow the irregularities in the surface of the road and remain in bearing therewith at all times to prevent lateral sliding of the wheels, known as skidding. The guide-plate 18 shown in the drawings resembles in its mounting and in its relation to the other parts the centerboard of a sail boat, being pivotally mounted at its front end to the frame of the runner at 19 and lying within a slot extending lengthwise through the runner, through which it is free to swing. The weight of the guide-plate alone may be relied upon to keep it in contact with the surface of the road, but some auxiliary means for this purpose may be advisable, such as the spring 20 which surrounds the stem 21 extending upwardly from the free rear end of the guide-plate and passing through an opening in a guide strip 22 of the truss work, said spring bearing at one end against the guide strip 22 and at the other end against the guide-plate to force the latter downwardly.

In order to prevent the device interfering with the swinging of the wheels on their knuckles the guide-plate is preferably provided with a downwardly extending projection 23 directly beneath the connection for the wheel, which projection will take the wear of the dragging guide-plate and offer less resistance to the swinging of the wheels than would be done if the guide-plate were not provided therewith.

In operation the anti-skidding devices of this invention may be quickly and easily applied when there is danger of skidding, due to the roads being covered with snow or ice, by merely removing the hub caps from the hub extensions of the wheels and slipping the parts in place thereon and then returning the hub caps to hold the parts in place. The runner is preferably of such size with relation to the diameter of the wheel that it is just out of contact with the road when the tire is fully inflated, which will prevent material wear on the runner when passing over paved streets where the snow or ice has been removed. When the car travels over snow, however, the runner comes into bearing therewith and its shoe is of sufficient bearing area to support the weight and permit the wheel to remain near the surface where it will offer less resistance to the turning of the steering wheel. At all times, whether the machine travels over snow or ice, the guide-plate 23 drags its sharp edge along the surface like a knife or a skate runner to prevent its movement laterally across the surface and thereby avoiding skidding.

The presence of the device of this invention does not interfere with the operation of the wheel, which is effective for supporting the weight of the vehicle on hard surfaces, but which is relieved of that duty more or less by the runners when the machine travels over snow or slush or mud. When much ice is to be met with the tires may be partially deflated to bring the runner into bearing on the surface and thus afford an additional safeguard against skidding.

While the invention is particularly described and claimed as applied to automobiles, it is equally applicable to other heavy vehicles, such as trucks and fire engines or the like, and is therefore not limited to use with any particular class of vehicle.

What I claim as new and desire to secure by Letters Patent is:

1. An anti-skidding attachment for automobiles, comprising a runner, a sleeve on the runner adapted for loose connection with the wheel hub, said runner operating in conjunction with the wheel by having its bearing surface slightly higher than the bearing surface of the wheel to become effective when the wheel sinks in snow and the like, and a guide plate carried by the runner and movable vertically thereon to remain in contact with an irregular road surface and prevent a lateral movement of the wheel on a slippery surface.

2. An anti-skidding attachment for automobiles, comprising a runner, a sleeve thereon adapted to fit upon the hub of the automobile wheel, said runner operating in conjunction with the wheel by having its bearing surface slightly higher than the bearing surface of the wheel to become effective when the wheel sinks in snow or the like, there being a slot extending longitudinally through the runner and a guide plate pivotally mounted in the slot and adapted to swing therethrough to maintain a contact with an irregular road surface and prevent lateral movement of the wheel on a slippery surface.

3. An anti-skidding attachment for automobiles, comprising a runner and sleeve connected thereto, a bushing loosely fitting within the sleeve and adapted to fit on the hub of the automobile wheel and be clamped thereon by the cap of said hub, said runner operating in conjunction with the wheel by having its surface slightly higher than the bearing surface of the wheel to become effective when the wheel sinks in snow or the like, the runner being provided with a longitudinal slot, and a guide plate pivotally mounted in the said slot to follow the irregularities of the road surface and to prevent lateral movement of the wheel on a slippery surface.

4. An anti-skidding attachment for automobiles, comprising a runner, adapted for connection with the automobile wheel and operating in conjunction with the wheel by having its bearing surface slightly higher than the bearing surface of the wheel to become effective upon the wheel sinking in snow or the like, and a guide plate pivotally connected to the runner to follow the surface of the road and provided with a downwardly projecting portion beneath the connection for the wheel for engagement with the road surface to prevent lateral movement of the wheel on a slippery surface.

5. An anti-skidding attachment for automobiles, comprising a runner adapted for connection with the automobile wheel and operating in conjunction with the wheel by having its bearing surface slightly higher than the bearing surface of the wheel to become effective upon the wheel sinking in snow or the like, there being a longitudinal slot in the bearing surface of the runner, a guide plate pivotally mounted at one end in said slot to follow the surface of the road and prevent lateral movement of the wheel on a slippery surface, and a spring bearing on the other end of the guide plate.

6. An anti-skidding attachment for automobiles and the like comprising a runner having its sole extending above it from one end to the other, a truss work connection between the upper and lower portions of the sole forming a frame, a tubular sleeve connected to the frame, a tubular bushing loosely fitting within the sleeve and adapted to fit on the hub extension of the automobile wheel and be held thereon by the hub cap of said extension, said runner operating in conjunction with the wheel by having its bearing surface slightly higher than the bearing surface of the wheel to become ef fective upon the wheel sinking in snow or the like, there being a longitudinal slot in the bearing surface of the runner, and a spring pressed guide plate pivotally mounted in said slot for following the surface of the road and preventing lateral movement of the wheel on a slippery surface.

In testimony whereof, I affix my signature, in presence of two witnesses.

EDMUND KRON.

Witnesses:
R. S. C. CALDWELL,
ALMA A. KLUG.

Copies of this patent may be obtained for five cents each, by addressing the "Commissioner of Patents, Washington, D. C."